US011028316B2

United States Patent
Aslam et al.

(10) Patent No.: US 11,028,316 B2
(45) Date of Patent: Jun. 8, 2021

(54) TUNABLE INJECTION FLUID BASED ON NATURAL GAS LIQUIDS, GAS, AND NANOPARTICLES FOR IMPROVED HYDROCARBON RECOVERY

(71) Applicant: Linde Aktiengesellschaft, Munich (DE)

(72) Inventors: Naveed Aslam, Houston, TX (US); Kevin G. Watts, Spring, TX (US); Roberta Watts, Smithville, TX (US); Carl Peter Ulfson Hagenfeldt, Houston, TX (US)

(73) Assignee: Linde Aktiengesellschaft, Munich (DE)

( * ) Notice: Subject to any disclaimer, the term of this patent is extended or adjusted under 35 U.S.C. 154(b) by 88 days.

(21) Appl. No.: 16/186,076

(22) Filed: Nov. 9, 2018

(65) Prior Publication Data
US 2019/0136119 A1 May 9, 2019

Related U.S. Application Data

(60) Provisional application No. 62/583,690, filed on Nov. 9, 2017.

(51) Int. Cl.
*E21B 43/16* (2006.01)
*C09K 8/594* (2006.01)
(Continued)

(52) U.S. Cl.
CPC .............. *C09K 8/594* (2013.01); *C09K 8/524* (2013.01); *C09K 8/584* (2013.01); *E21B 43/16* (2013.01);
(Continued)

(58) Field of Classification Search
None
See application file for complete search history.

(56) References Cited

U.S. PATENT DOCUMENTS

| 10,570,715 | B2 * | 2/2020 | Babcock | ................ | C09K 8/584 |
| 2003/0220204 | A1 * | 11/2003 | Baran, Jr. | ................ | C09K 8/58 |
| | | | | | 507/200 |

(Continued)

OTHER PUBLICATIONS

N.A. Ogolo et al: "Enhanced Oil Recovery Using Nanoparticles". SPE Saudi Arabia Section Technical Symposium and Exhibition, Jan. 1, 2012 (Jan. 1, 2012), XP55561116, DOI: 10.2118/160847-MS, p. 1 -p. 5.

(Continued)

*Primary Examiner* — Andrew Sue-Ako
(74) *Attorney, Agent, or Firm* — Patterson + Sheridan, LLP (57) ABSTRACT

A hydrocarbon well remediation/stimulation treatment based on an Y-Grade natural gas liquid injection fluid mixture, including prescribed amounts of gas, nanoparticles with wettability alteration properties, foaming agents (including nanoparticles with foam stabilization properties), and solvent additives. The fluid mixture may be tuned to address multiple factors contributing to production decline, such as liquid blockage, wettability properties, fines/debris/scale build-up and organic deposits, reservoir heterogeneity/permeability, and/or reservoir fluid and hydrocarbon compositions, resulting in hydrocarbon production enhancement. The treatment is typically applied with a Huff-n-Puff process, however may also be applied with a flooding process.

20 Claims, 9 Drawing Sheets

(51) Int. Cl.
*C09K 8/584* (2006.01)
*C09K 8/524* (2006.01)
(52) U.S. Cl.
CPC ........ *E21B 43/168* (2013.01); *C09K 2208/06* (2013.01); *C09K 2208/10* (2013.01)

(56) References Cited

U.S. PATENT DOCUMENTS

| 2015/0198027 | A1* | 7/2015 | Wickramathilaka ... | C09K 8/594 |
| | | | | 166/272.4 |
| 2017/0240804 | A1* | 8/2017 | Tellez ................... | C09K 8/473 |
| 2017/0247609 | A1 | 8/2017 | Daigle et al. | |
| 2017/0292057 | A1 | 10/2017 | Babcock et al. | |
| 2017/0292059 | A1 | 10/2017 | Babcock et al. | |
| 2018/0002595 | A1* | 1/2018 | Neil ...................... | C09K 8/592 |

OTHER PUBLICATIONS

Swaminathan Ponmani et al: "Applications of Nanotechnology for Upstream Oil and Gas Industry", Journal of Nano Research : JNANOR, vol. 24, Jan. 1, 2013 (Jan. 1, 2013), pp. 7-15, XP55560932, CH, ISSN: 1662-5250, DOI: 10.4028/www.scientific.net/JNanoR. 24.7, p. 7-p. 13.
PCT International Search Report/Written Opinion dated Mar. 6, 2019 for Application No. PCT/IB2018/001351.

* cited by examiner

TUNABLE INJECTION FLUID BASED ON NATURAL GAS LIQUIDS, GAS, AND NANOPARTICLES FOR IMPROVED HYDROCARBON RECOVERY

CROSS REFERENCE TO RELATED APPLICATION

This application claims priority to U.S. Provisional Patent Application Ser. No. 62/583,690, filed on Nov. 9, 2017, which is incorporated herein by reference in its entirety.

BACKGROUND

Field

Embodiments of the disclosure relate to a tunable injection fluid based on natural gas liquids, gas, and nanoparticles for improved hydrocarbon recovery. Embodiments of the disclosure also relate to a hydrocarbon well remediation/stimulation treatment based on a Y-Grade natural gas liquids injection fluid mixture, including prescribed amounts of gas, nanoparticles with wettability alteration properties, foaming agents (including nanoparticles with foam stabilization properties), and solvent additives.

Description of the Related Art

Hydrocarbon wells will experience production decline over time. There are many factors contributing to this decline, such as reduced reservoir pressure, liquid blockage, wettability properties, fines/debris/scale build-up and organic deposits, reservoir heterogeneity/permeability, reservoir fluid and hydrocarbon compositions, and/or hydrocarbon entrapment in micro/nano size fractures and pores, etc. There are different remediation methods to help stimulate hydrocarbon recovery from hydrocarbon wells that are experiencing production decline. One method is cyclic steam and/or gas injection known as "Huff and Puff".

These remediation methods address one or a couple of the factors contributing to the decline in production but not a majority of the factors. Ideally there should be a tunable injection fluid that can be prescribed to have a broad range of properties and thereby simultaneously achieve a multi-spectrum treatment that targets several or all of the problems contributing to production decline in a hydrocarbon well, resulting in improved hydrocarbon recovery.

SUMMARY

In one embodiment, there is disclosed a tunable injection fluid comprising Y-Grade natural gas liquids (NGLs), nanoparticles, and a gas. In one embodiment, there is disclosed a hydrocarbon well remediation/stimulation treatment based on an Y-Grade NGL injection fluid mixture, including prescribed amounts of gas, nanoparticles with wettability alteration properties, foaming agents (including nanoparticles with foam stabilization properties), and solvent additives.

Y-Grade NGLs is an unfractionated hydrocarbon mixture that is a byproduct of a de-methanized hydrocarbon stream and comprises ethane, propane, butane, isobutene, pentane plus, and less than 1 percent methane. The Y-Grade NGLs represents a carrier fluid and is a miscible solvent interacting with liquid hydrocarbons, reducing viscosity, thus increasing mobility. The nanoparticles are hydrophobic nanoparticles with functionalized surface properties in solution with Y-Grade NGLs. The nanoparticles contribute to wettability alteration of solid surfaces, and modification of surface energy of all media, thus facilitating mobility. The gas provides volume, mechanical force, and transports the liquids, nanoparticles, and any other additives to be evenly distributed within the reservoir thus optimizing the treatment.

In one embodiment, there is disclosed a tunable injection fluid comprising Y-Grade NGLs, nanoparticles, a foaming agent, and a gas. The foaming agent is a surfactant, a nanoparticle with surfactant surface layers (e.g. nanoparticles with surfactant based surface treatment), or combinations thereof. For example, the foaming agent includes hydrophobic nanoparticles with surfactant surface layers, in solution with Y-Grade NGLs, for generation of foam. The foam provides conformance and mobility control in reservoirs with high heterogeneity, enabling even distribution of the foam, Y-Grade NGLs, nanoparticles, and any other additives within the reservoir, thus optimizing the treatment.

In one embodiment, there is disclosed several additives, such as solvents, that can be added to the tunable injection fluid. The additives include but are not limited to xylene, toluene, and/or heptane configured to solubilize and remove organic deposits, including paraffin and asphaltenes. The reduction of paraffin and asphaltenes increases flow paths, thus facilitating increased recovery.

In one embodiment, there is disclosed a method of treatment of a hydrocarbon bearing reservoir, comprising first injecting the tunable injection fluid at sufficient pressure to overcome hydrostatic counter pressure, and second injecting gas at a pressure to achieve defined distribution (e.g. less than 500 psi). In the case of foam, the method includes generating the foam in-situ within the reservoir driven by friction between gas, liquid, and reservoir rock. The first and second injections may be performed alternately up to 5 cycles, followed by 1-2 days soaking (e.g. well closed in), thereafter production of hydrocarbons from the reservoir.

In one embodiment, there is disclosed a method for improving the wettability of a hydrocarbon bearing reservoir comprising feeding nanoparticles in a Y-Grade NGL mixture to the hydrocarbon bearing reservoir, then injecting an inert gas into the hydrocarbon bearing reservoir.

In one embodiment, there is disclosed a method for recovering oil from a hydrocarbon bearing reservoir comprising the steps of feeding nanoparticles in a Y-Grade NGL mixture into the hydrocarbon bearing reservoir; closing the hydrocarbon bearing reservoir thereby to allow circulation of the nanoparticles in the hydrocarbon bearing reservoir; opening the hydrocarbon bearing reservoir; feeding nitrogen into the hydrocarbon bearing reservoir; and recovering oil from the hydrocarbon bearing reservoir. Inside the reservoir, the properties of nanoparticles are mainly governed by their surface energies and therefore the adsorption of nanoparticles described herein on a solid rock surface will significantly change the surface energy and wettability of the rock.

Two alternative designs are described herein with both designs being tunable with respect to their formation characteristics. In a first embodiment, an egg-shell design of nanoparticles for wettability alteration is described. In a second embodiment, a tethered surface modification on a core of nanoparticle is described. In both instances, the nanoparticles can be employed in hydrocarbon bearing reservoirs. The concentration of nanoparticles can also affect the contact angle between the rock surface and the nanoparticle. The variation in contact angle are a function of concentration depending upon the substrate material forming the rock surface and particle size. For the same mass concentration, smaller-sized particles will lead to larger changes in contact angle. As such, free energy increases for smaller-sized nanoparticles.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The embodiments described herein include a hydrocarbon well remediation/stimulation treatment based on a Y-Grade natural gas liquid injection fluid mixture, including prescribed amounts of gas, nanoparticles with wettability alteration properties (e.g. surface functionalized nanoparticles), optionally foaming agents (including nanoparticles with foam stabilization properties), and optionally solvent additives.

Surface functionalized nanoparticles include but are not limited to nanoparticles configured to alter (e.g. increase) the wettability of solid surfaces (e.g. reservoir rock surfaces) within a hydrocarbon bearing reservoir and/or alter the interfacial tension between fluids in the reservoir. The surface functionalized nanoparticles include but are not limited to nanoparticles having a surface treatment, such as an outer shell surrounding a core particle or an element tethered/bonded to a core particle, configured to alter (e.g. increase) the wettability of reservoir rock solid surfaces within a hydrocarbon bearing reservoir and/or alter the interfacial tension between fluids in the reservoir. The surface functionalized nanoparticles are configured to retain stable properties (e.g. wettability and/or interfacial tension altering properties) when mixed with Y-Grade natural gas liquids and under various reservoir conditions, including various reservoir temperatures, reservoir pressures, and/or reservoir fluid compositions. The terms "nanoparticles" and "surface functionalized nanoparticles" may be used interchangeably when describing the embodiments disclosed herein.

Wettability is the tendency of one fluid to spread or adhere to a solid surface in the presence of other immiscible fluids. Fracturing treatments are often utilized to stimulate and improve fluid conductivity between an oil producing wellbore and an underground hydrocarbon formation to increase fluid production rates and associated reserves. Hydraulic fracture treatments are typically used in low-permeability formations, in conventional reservoirs and in unconventional reservoirs.

Wettability conditions are strongly affected by several factors in underground hydrocarbon formations such as rock mineralogy, the constituents of the oil and conditions of pore surfaces, the adsorption or deposition of oil constituents on the rock surfaces, oil compositions and other reservoir characteristics. More than half of the world oil reservoirs are carbonate and almost 80% of these are classified as neutral to oil-wet. In these reservoirs, undesirable capillary pressure prevents the spontaneous release of water from the natural fractures into the matrix blocks. As such, as most carbonate reservoirs tend to be oil-wet, the amount of oil recovered by water injection is not as economically viable as by other means.

Ultrafine nanoparticles could alter the wettability of oil reservoir rock by adsorbing on the rock surface and forming a water wet surface on the rock surface. In this manner, the viscous forces required to overcome capillary forces are dramatically reduced, and oil recovery can be improved. Nanoparticles are typically solids and require a fluid to carry them into the hydrocarbon bearing reservoir. The effectiveness of nanoparticles in wettability alteration applications will depend on the type of fluid that is used for dispersing the nanoparticles in the hydrocarbon bearing reservoir. The fluid used for dispensing the nanoparticles therefore has an important role in the recovery of hydrocarbons from conventional and un-conventional resources, contributing not only the ability to carry the nanoparticles but providing enhancements in oil recovery.

In one embodiment, a fluid that could be employed with nanoparticles is Y-Grade natural gas liquids (NGL). Y-Grade NGLs provide proper solvency and immiscibility with formation water in the hydrocarbon bearing reservoir. In one embodiment, Y-Grade NGL comprise: ethane, wherein the ethane comprises about 30% to 80% of the fluid; propane, wherein the propane comprises about 15% to 50% of the fluid; butane, wherein the butane comprises about 15% to 45% of the fluid; isobutane, wherein the isobutane comprises about 15% to 40% of the fluid; and pentane plus, wherein the pentane plus comprises about 5% to 25% of the fluid.

Y-Grade NGL is an unfractionated hydrocarbon mixture comprising ethane, propane, normal butane, isobutane, and pentane plus. Pentane plus comprises pentane, isopentane, and/or heavier weight hydrocarbons, for example hydrocarbon compounds containing at least one of C5 through C8+. Pentane plus may include natural gasoline. The Y-Grade NGL composition may vary according to the unconventional or conventional reservoir that it is sourced.

Typically, Y-Grade NGL is a by-product of condensed and de-methanized hydrocarbon streams that are produced from shale wells for example and transported to a centralized facility where the hydrocarbon stream is cooled to a temperature at or below 0 degrees Fahrenheit to condense out an unfractionated hydrocarbon mixture comprising ethane, propane, normal butane, isobutane, and pentane. The hydrocarbon streams are de-methanized to have a methane content of less than 1%, or less than 0.5%, by liquid volume. Y-Grade NGL can be locally sourced from a splitter facility, a gas plant, and/or a refinery and transported by truck or pipeline to a point of use. In its un-fractionated or natural state (under certain pressures and temperatures, for example within a range of 250-600 psig and at wellhead or ambient temperature), Y-Grade NGL has no dedicated market or known use. Y-Grade NGL must undergo processing before its true value is proven.

Y-Grade NGL differs from liquefied petroleum gas ("LPG"). One difference is that LPG is a fractionated product comprised of primarily propane, or a mixture of fractionated products comprised of propane and butane. Another difference is that LPG is a fractioned hydrocarbon mixture, whereas Y-Grade NGL is an unfractionated hydrocarbon mixture. Another difference is that LPG is produced in a fractionation facility via a fractionation train, whereas Y-Grade NGL can be obtained from a splitter facility, a gas plant, and/or a refinery. A further difference is that LPG is a pure product with the exact same composition, whereas Y-Grade NGL can have a variable composition.

In its unfractionated state, Y-Grade NGL is not an NGL purity product and is not a mixture formed by combining one or more NGL purity products. An NGL purity product is defined as an NGL stream having at least 90% of one type of carbon molecule. The five recognized NGL purity products are ethane (C2), propane (C3), normal butane (NC4), isobutane (IC4) and natural gasoline (C5+). The unfractionated hydrocarbon mixture must be sent to a fractionation facility, where it is cryogenically cooled and passed through a fractionation train that consists of a series of distillation towers, referred to as deethanizers, depropanizers, and debutanizers, to fractionate out NGL purity products from the unfractionated hydrocarbon mixture. Each distillation tower generates an NGL purity product. Liquefied petroleum gas is an NGL purity product comprising only propane, or a mixture of two or more NGL purity products, such as propane and butane. Liquefied petroleum gas is therefore a fractionated hydrocarbon or a fractionated hydrocarbon mixture.

In one embodiment, Y-Grade NGL comprises condensed, dehydrated, desulfurized, and de-methanized natural gas stream components that have a vapor pressure of not more than about 600 psig at 100 degrees Fahrenheit, with aromatics below about 1 weight percent, and olefins below about 1 percent by liquid volume. Materials and streams useful for the embodiments described herein typically include hydrocarbons with melting points below about 0 degrees Fahrenheit.

In one embodiment, Y-Grade NGL is created in a local natural gas processing plant or splitter facility as a by-product of condensing a wet de-methanized natural gas stream at a temperature at or below 0 degrees Fahrenheit. This is typically accomplished by first dehydrating the natural gas stream to remove entrapped water, and then cooling the natural gas stream by reducing the temperature below the hydrocarbon dew point temperature (at or below 0 degrees Fahrenheit for example) to thereby condense a portion of the natural gas stream into Y-Grade NGL.

In one embodiment, the nanoparticles are dispersed in the Y-Grade NGL which is fed into the hydrocarbon bearing reservoir in the form of an injection fluid. This injection fluid can further be displaced with a gas, such as nitrogen or carbon dioxide, to provide a better sweep efficiency throughout the reservoir, thereby driving the nanoparticles deeper into the reservoir. The gas is non-wetting so the overall effect would be an even further alteration of the reservoir wettability effects by the combination of Y-Grade NGL and the nanoparticles.

In one embodiment, an injection fluid comprising Y-Grade NGL and nanoparticles is introduced into a hydrocarbon bearing reservoir followed by the injection of an inert gas. The injection fluid is miscible in conventional reservoirs and helps transport the nanoparticles further into the reservoir. The advantages this presents is reduced losses in the formation rock and water, thereby providing the ability to deliver nanoparticles to the desired locations within the reservoir where residual oil is immobilized in pore sites of the reservoir rock.

In one embodiment, a Huff-n-Puff process is used for recovering oil from a hydrocarbon bearing reservoir where a single well is used for both the injection of the injection fluid and the production of hydrocarbons. The Y-Grade NGL containing nanoparticles is injected into the hydrocarbon bearing reservoir; the single well is shut down to let the fluids in the reservoir swell, while reducing viscosity and increasing the pressure of the reservoir. After, the single well is opened a gas, such as nitrogen, is introduced to create immiscible displacement and cleaning of the area within the reservoir near the wellbore. After production from the hydrocarbon bearing reservoir begins and oil is recovered.

In one embodiment, the nanoparticles can be dissolved in a water pill that is displaced first by Y-Grade NGL and then followed by a gas, such as nitrogen or carbon dioxide.

In one embodiment, the nanoparticles may include tethered materials, such as oleic acid or acrylic acid, bonded to the outer surface of silica nanoparticles, which provide the nanoparticles with the ability to adsorb inside pores of the reservoir rock containing hydrocarbons.

In one embodiment, the nanoparticles may include a silica core with an outer shell of non-conductive or conductive polymers, such as polyethylene glycol or polyaniline. The outer shell could then be further impregnated with charged ionic species to increase the delivery and effectiveness of adsorption of these nanoparticles inside pores of the reservoir rock containing hydrocarbons, such as oil.

Figure 1:
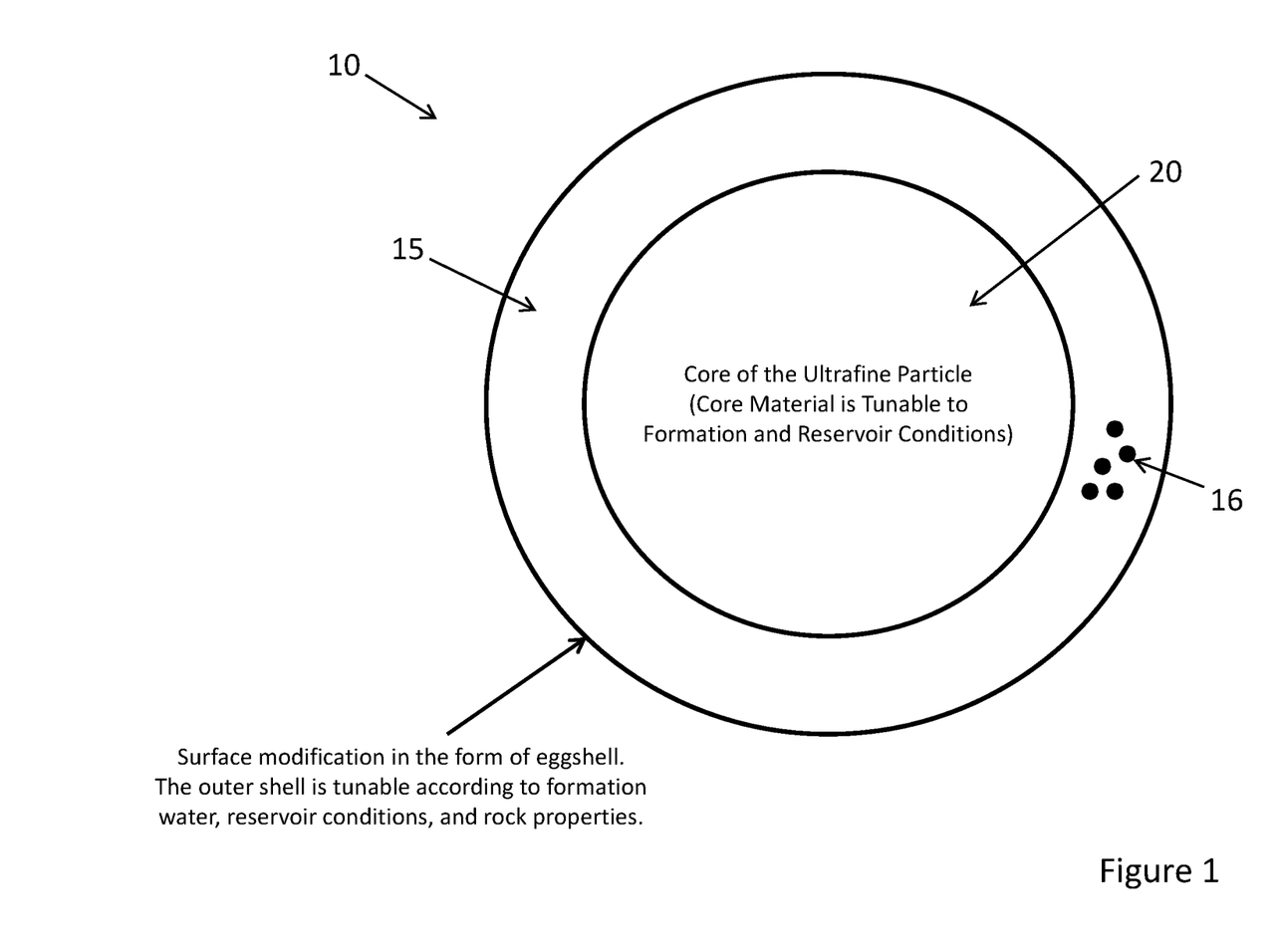
FIG. 1 is a schematic cross-sectional view of an ultrafine tunable nanoparticle showing a core of ultrafine particle surrounded by a surface modification outer shell.

FIG. 1 illustrates schematic view of an eggshell, ultrafine tunable nanoparticle 10 having a core 20 of ultrafine particle surrounded by an outer shell 15 according to one embodiment. The core 20 of the nanoparticle 10 can be made tunable to the nature and conditions of a hydrocarbon bearing reservoir into which the nanoparticle 10 will be injected to help recover hydrocarbons from the reservoir. The nature and conditions include the type of hydrocarbons, nature of the reservoir rock, etc. The outer surface of the core 20 can be modified by adding the outer shell 15 to the core 20. The outer shell 15 is also tunable to the nature and conditions of the reservoir. The outer shell 15 may be impregnated with a charged ionic species 16.

Figure 2:
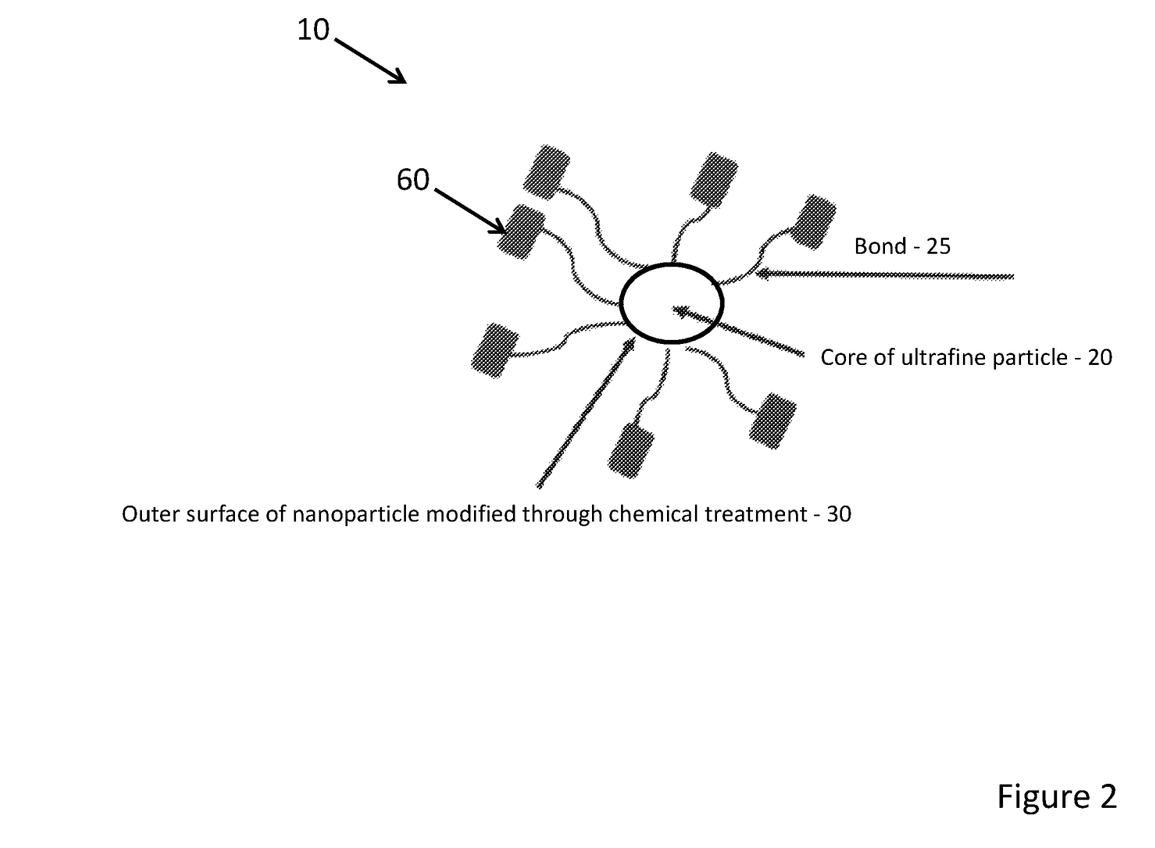
FIG. 2 is a schematic view showing a core of ultrafine particles with an outer surface of nanoparticle modified through chemical treatment.

FIG. 2 illustrates a schematic view of a tethered, ultra-fine tunable nanoparticle 10 having a core 20 of ultrafine particle that is bonded by one or more bonds 25 to one or more tethered materials 60. The outer surface 30 of the nanoparticle 10 can also be modified through additional chemical treatment beyond the addition of the bonded tethered materials 60.

Figure 3:
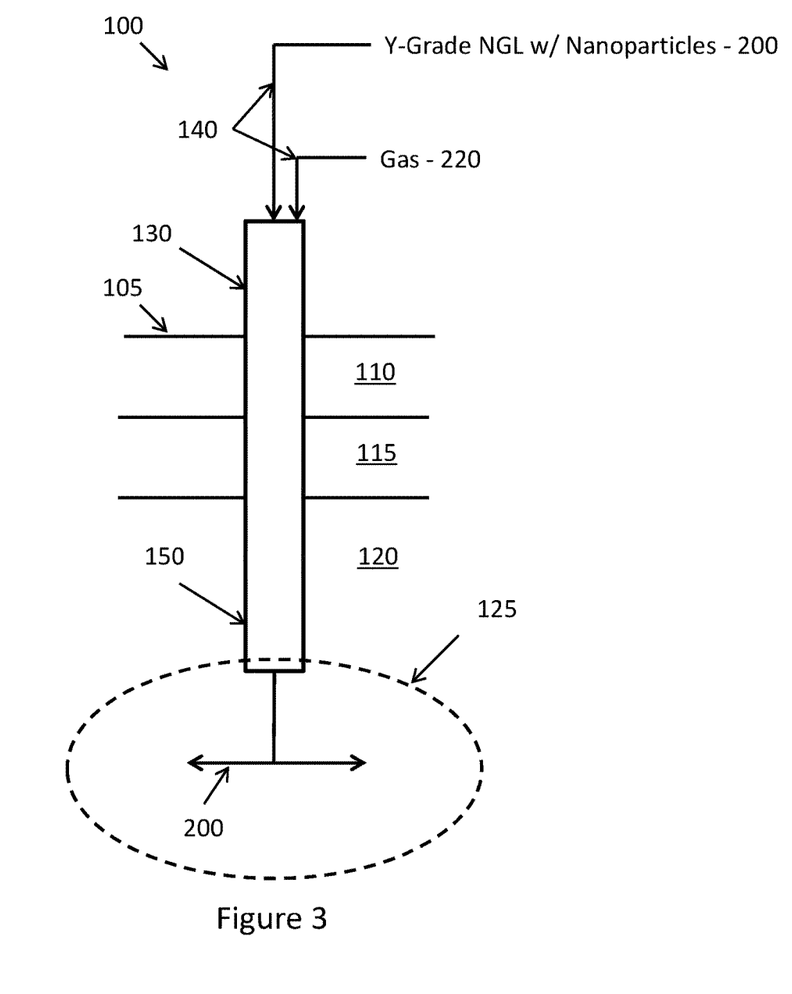
FIG. 3 is a schematic view showing a hydrocarbon recovery system injecting an injection fluid into a hydrocarbon bearing reservoir according to one embodiment.

FIG. 3 is a schematic view showing a hydrocarbon recovery system 100 injecting an injection fluid 200 through an injection well 150 (that is drilled through several formation layers 110, 115, 120) into a hydrocarbon bearing reservoir 125, which may be a conventional or an unconventional reservoir, according to one embodiment. As shown in FIG. 3, the injection fluid 200 is injected into the reservoir 125 through a fluid line 140 that is in fluid communication with wellhead equipment 130. The wellhead equipment 130 is located at the surface 105 and is configured to inject and/or produces fluids into and/or from the reservoir 125 through the injection well 150.

The injection fluid 200 comprises Y-Grade NGL and nanoparticles (e.g. surface functionalized nanoparticles), including but not limited to the eggshell and/or tethered, ultra-fine tunable nanoparticles 10 shown in FIGS. 1 and 2, respectively, and/or any other nanoparticles described herein. The injection fluid 200 may further include additives such as xylene, toluene, and/or heptane configured to solubilize and remove organic deposits, such as paraffin, asphaltenes, and the like from the reservoir 125. The injection fluid 200 comprises 2 percent or less by volume of the nanoparticles. The nanoparticles may be hydrophobic or hydrophilic. The nanoparticles or the core of the nanoparticles may have a diameter less than 0.1 μm or 100 nm.

The nanoparticles may be mixed directly with the Y-Grade NGL and/or mixed first with a solvent, such as ethanol, and then mixed with the Y-Grade NGL. In one embodiment, the surface functionalized nanoparticles are hydrophobic and suspended in a solvent solution, such as ethanol, that solubilizes with the Y-Grade NGL when mixed together. In one embodiment, the solvent solution may be a component of the Y-Grade NGL, such as propane, butane, and/or pentane, for dispersion and stability. In one embodiment, the surface functionalized nanoparticles are hydrophilic and suspended in an aqueous solution when mixed with the Y-Grade NGL such that the injection fluid is in the form of an emulsion having an aqueous phase as the internal phase of the emulsion.

Figure 4:
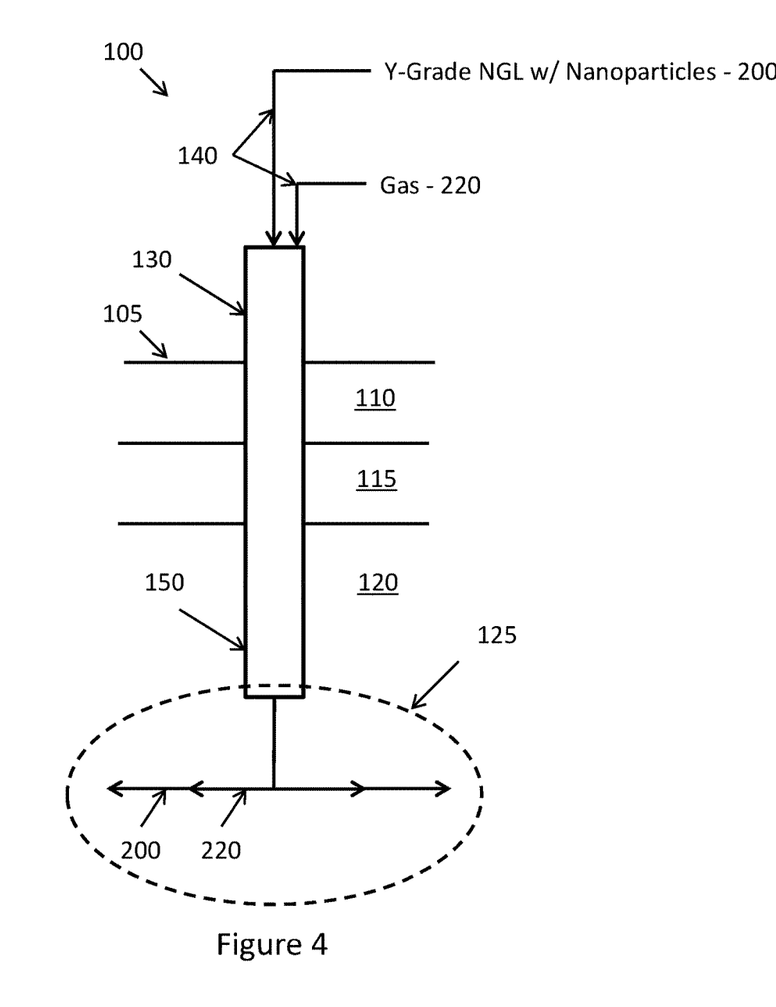
FIG. 4 is a schematic view showing the hydrocarbon recovery system injecting a gas into the hydrocarbon bearing reservoir according to one embodiment.

FIG. 4 is a schematic view showing the hydrocarbon recovery system 100 injecting a gas 220 into the hydrocarbon bearing reservoir 200 according to one embodiment. As shown in FIG. 4, the gas 220 is injected into the reservoir 125 through a fluid line 140 that is in fluid communication with the wellhead equipment 130 and the injection well 150. The gas 220 comprises nitrogen, carbon dioxide, argon, natural gas, gas previously produced from the reservoir 125, and/or combinations thereof.

The gas 220 helps displace the injection fluid 200 further into the reservoir 125. The gas 220 may be injected into the reservoir 125 prior to injecting the injection fluid 200 to pre-treat the reservoir 125, such as by removing liquid blockage, fines/debris/scale accumulation, and/or build-up of paraffin and/or asphaltenes within the reservoir 125 near the injection well 150. The injection fluid 200 and the gas 220 may be alternatively injected into the reservoir 125 multiple times. The injection fluid 200 and/or the gas 220 may be allowed to soak within the reservoir 125 for a pre-determined amount of time, such as a period of days, weeks, or months prior to beginning production from the reservoir 125.

Figure 5:
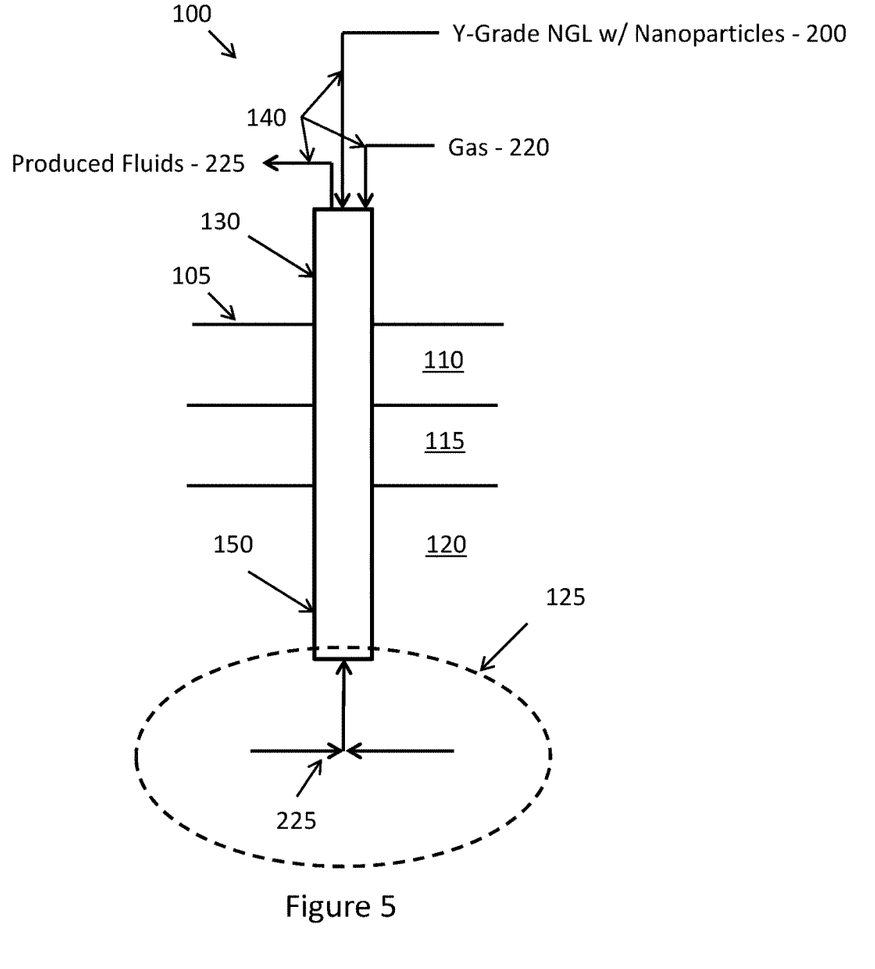
FIG. 5 is a schematic view showing the hydrocarbon recovery system producing hydrocarbons from the hydrocarbon bearing reservoir according to one embodiment.

FIG. 5 is a schematic view showing produced fluids 225 being recovered from the hydrocarbon bearing reservoir 125 through the injection well 150 and a fluid line 140 located at the surface 105 according to one embodiment. FIGS. 3-5 illustrate a Huff-n-Puff process as known in the art. The produced fluids 225 may include hydrocarbon liquids and/or gases, Y-Grade NGL, nanoparticles, and/or the gas injected into the reservoir 125. Hydrocarbon gases produced from the reservoir 125 can subsequently be used the gas 220.

Figure 6:
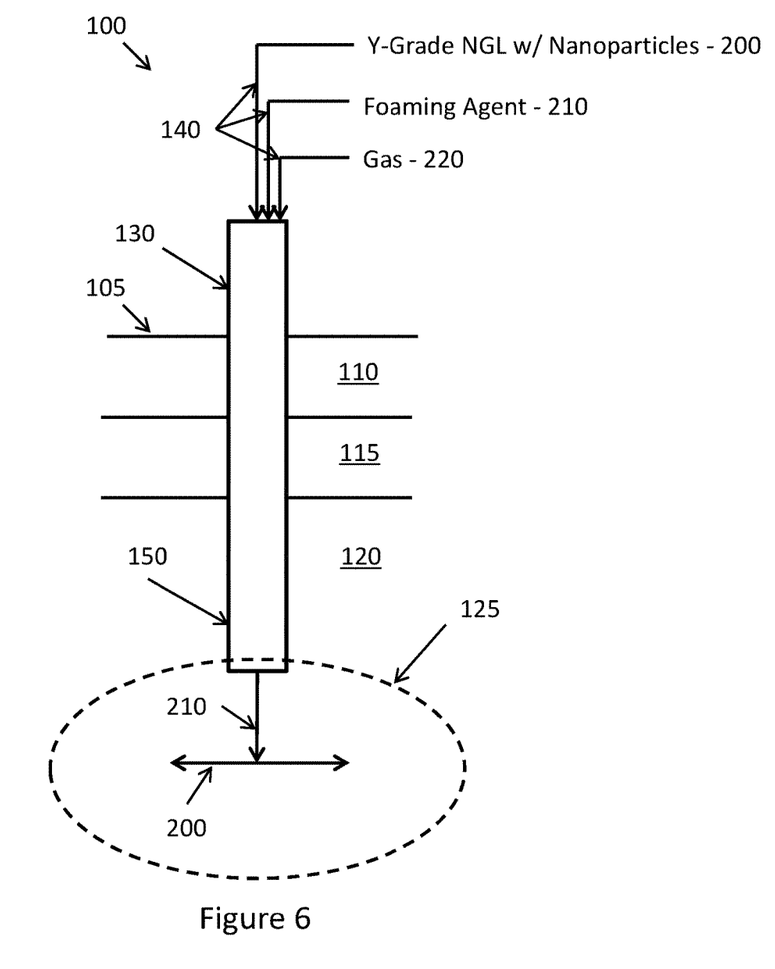
FIG. 6 is a schematic view showing a hydrocarbon recovery system injecting an injection fluid and a foaming agent into a hydrocarbon bearing reservoir to generate foam in-situ within the reservoir according to one embodiment.

FIG. 6 is a schematic view showing the hydrocarbon recovery system injecting the injection fluid 200 and a foaming agent 210 through the injection well 150 into the hydrocarbon bearing reservoir 125 to ultimately generate foam in-situ within the reservoir 125 according to one embodiment. As shown in FIG. 6, the injection fluid 200 and the foaming agent 210 are injected into the reservoir 125 through fluid lines 140 that are in fluid communication with wellhead equipment 130. Although the foaming agent 210 is shown separate from the injection fluid 200, the foaming agent 210 can be combined with the injection fluid 200 at the surface 105 and injected together as the injection fluid.

The injection fluid 200 comprises Y-Grade NGL and nanoparticles (e.g. surface functionalized nanoparticles), including but not limited to the eggshell and/or tethered, ultra-fine tunable nanoparticles 10 shown in FIGS. 1 and 2, respectively, and/or any other nanoparticle described herein. The injection fluid 200 may further include additives such as xylene, toluene, and/or heptane configured to solubilize and remove organic deposits, such as paraffin, asphaltenes, and the like from the reservoir 125. The foaming agent 210 may include a surfactant or a nanoparticle/surfactant material. The injection fluid 200, the foaming agent 210, and the gas 220 when combined, e.g. the foam, comprise 2 percent or less by volume of the nanoparticles. The nanoparticles may be hydrophobic or hydrophilic. The nanoparticles or the core of the nanoparticles may have a diameter less than 0.1 μm or 100 nm.

The foaming agent 210 is configured to generate foam in-situ within the reservoir 125 when combined with the Y-Grade NGL, nanoparticles, and the gas 220 for mobility control, resulting in an efficient distribution of the foam, Y-Grade NGL, nanoparticles, and gas within the reservoir 125. In one embodiment, the foaming agent 210 is a fluoro-based surfactant and/or a siloxane-based surfactant. In one embodiment, the foaming agent 210 is a hydrophobic nanoparticle with a fluoro-based and/or siloxane-based surfactant surface immobilization. Immobilization of the surfactant on the surface of the nanoparticle may include but is not limited to the outer surface of the nanoparticle being treated, doped, covered, impregnated, etc., with surfactant using any type of treatment mechanism known in the art. In one embodiment, the foaming agent 210 is a mixture of a fluoro-based and/or siloxane-based surfactant, and a hydrophobic nanoparticle with a fluoro-based and/or siloxane-based surfactant surface immobilization.

In one embodiment, the foaming agent has a core particle and an outer shell surrounding the core particle (e.g. as shown in FIG. 1). The core particle is a silica core, and the outer shell is a non-conductive or conductive polymer, selected from a group consisting of polyethylene glycol and polyaniline, and impregnated with a charged ionic species.

In one embodiment, the foaming agent has a core particle and a tethered material bonded to the core particle (e.g. as shown in FIG. 2). The core particle comprises a silica core, and the tethered material comprises oleic acid or acrylic acid bonded to the surface of the silica core.

The nanoparticles may be mixed directly with the Y-Grade NGL and/or mixed first with a solvent, such as ethanol, and then mixed with the Y-Grade NGL. In one embodiment, the surface functionalized nanoparticles are hydrophobic and suspended in a solvent solution, such as ethanol, that solubilizes with the Y-Grade NGL when mixed together. In one embodiment, the surface functionalized nanoparticles are hydrophilic and suspended in an aqueous solution when mixed with the Y-Grade NGL such that the injection fluid is in the form of an emulsion having an aqueous phase as the internal phase of the emulsion.

In one embodiment, the injection fluid 200 is initially injected into the reservoir 125, then the foaming agent 210 is subsequently injected into the reservoir 125 to mix with the injection fluid 200, and then the gas 220 is subsequently injected into the reservoir 125 to mix with the injection fluid 200 and the foaming agent 210 to form foam in-situ within the reservoir 125. In one embodiment, the injection fluid 200 and the foaming agent 210 are simultaneously injected into the reservoir 125, and then the gas 220 is subsequently injected into the reservoir 125 to mix with the injection fluid 200 and the foaming agent 210 to form foam in-situ within the reservoir 125. In one embodiment, the injection fluid 200 and the foaming agent 210 are initially mixed on the surface 105 and subsequently injected into the reservoir 125 together as the injection fluid 200, and then the gas 220 is subsequently injected into the reservoir 125 to mix with the injection fluid to form foam in-situ within the reservoir 125.

Figure 7:
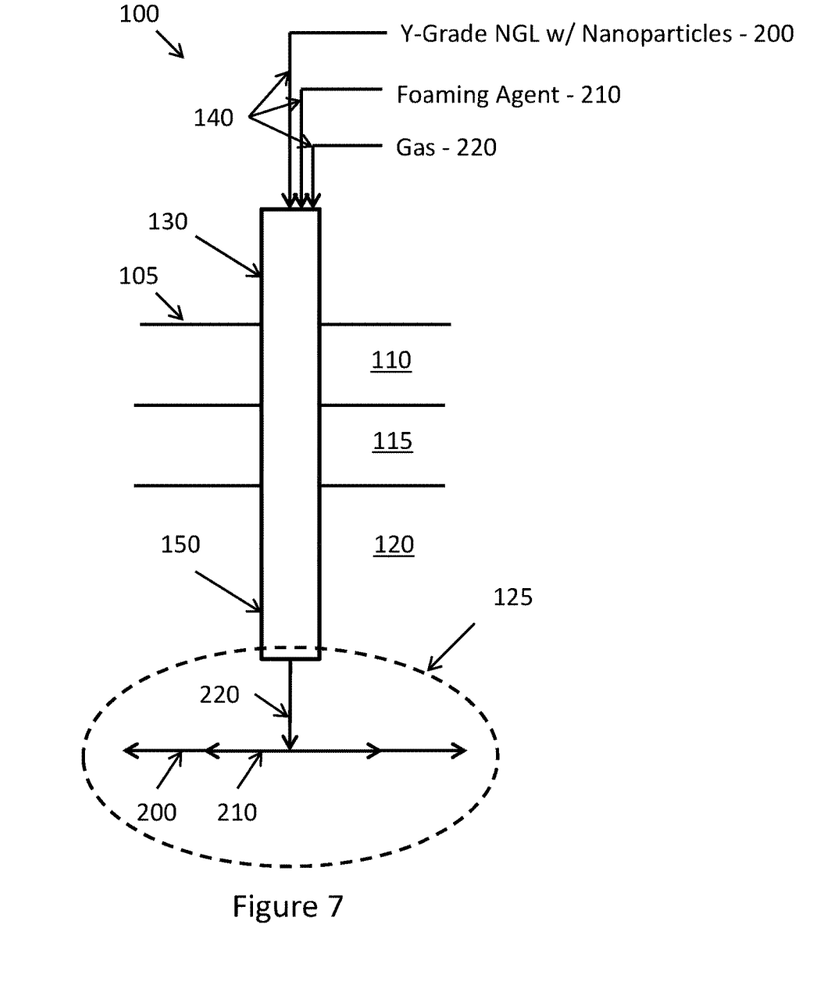
FIG. 7 is a schematic view showing the hydrocarbon recovery system injecting a gas into the hydrocarbon bearing reservoir according to one embodiment.

FIG. 7 is a schematic view showing the hydrocarbon recovery system 100 injecting the gas 220 into the hydrocarbon bearing reservoir 200 to help generate and displace the foam further into the reservoir 125. The gas 220 may be injected into the reservoir 125 prior to injecting the injection fluid 200 and/or the foaming agent 210 to pre-treat the reservoir 125, such as by removing liquid blockage, fines/debris/scale accumulation, and/or build-up of paraffin and/or asphaltenes within the reservoir 125 near the injection well 150. The injection fluid 200, the foaming agent 210, and the gas 202 may be alternatively injected into the reservoir 125 multiple times. The injection fluid 200, the foaming agent 210, and/or the gas 220 (e.g. the foam when combined) may be allowed to soak within the reservoir 125 for a pre-determined amount of time, such as a period of days, weeks, or months prior to beginning production from the reservoir 125.

Figure 8:
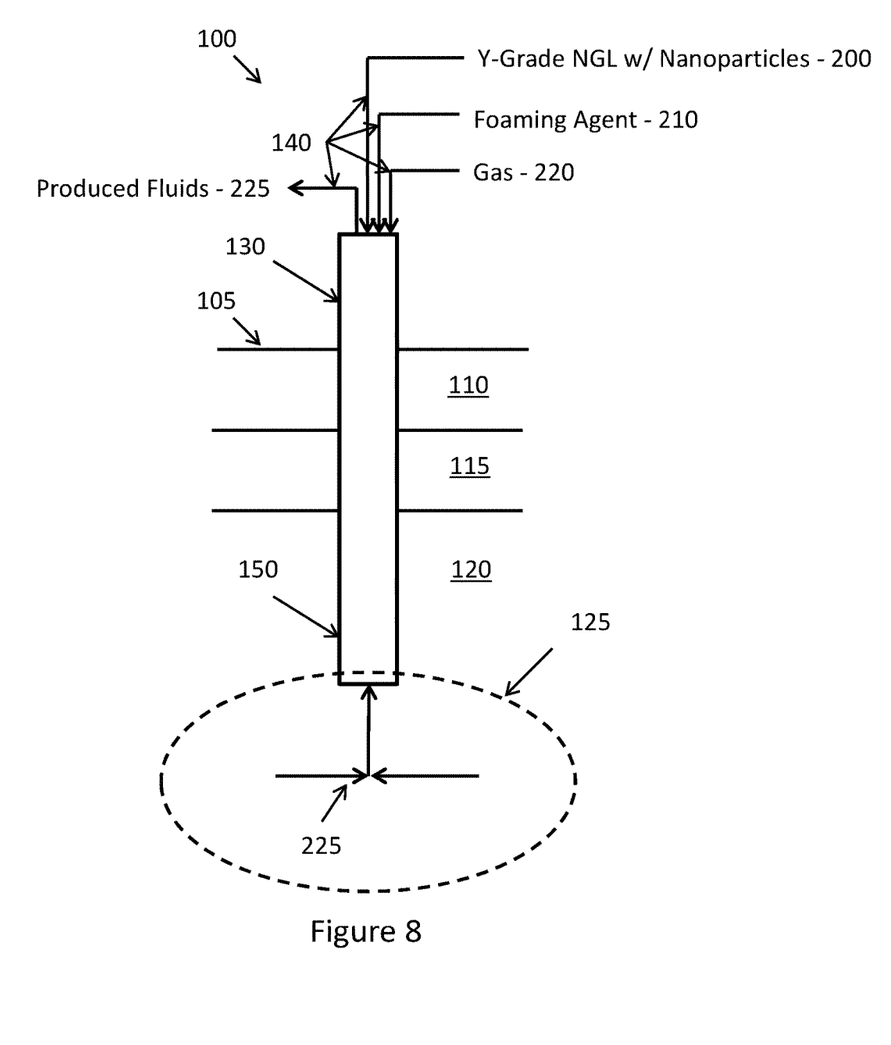
FIG. 8 is a schematic view showing the hydrocarbon recovery system producing hydrocarbons from the hydrocarbon bearing reservoir according to one embodiment.

FIG. 8 is a schematic view showing produced fluids 225 being recovered from the hydrocarbon bearing reservoir 125 through the injection well 150 and a fluid line 140 located at the surface 105 according to one embodiment. FIGS. 6-8 illustrate a Huff-n-Puff process as known in the art. The produced fluids 225 may include hydrocarbon liquids and/or gases, Y-Grade NGL, nanoparticles, the gas 220, and/or foam generated in-situ within the reservoir 125. Hydrocarbon gases and/or the gas 220 produced from the reservoir 125 can subsequently be used or re-used as the gas 220.

Figure 9:
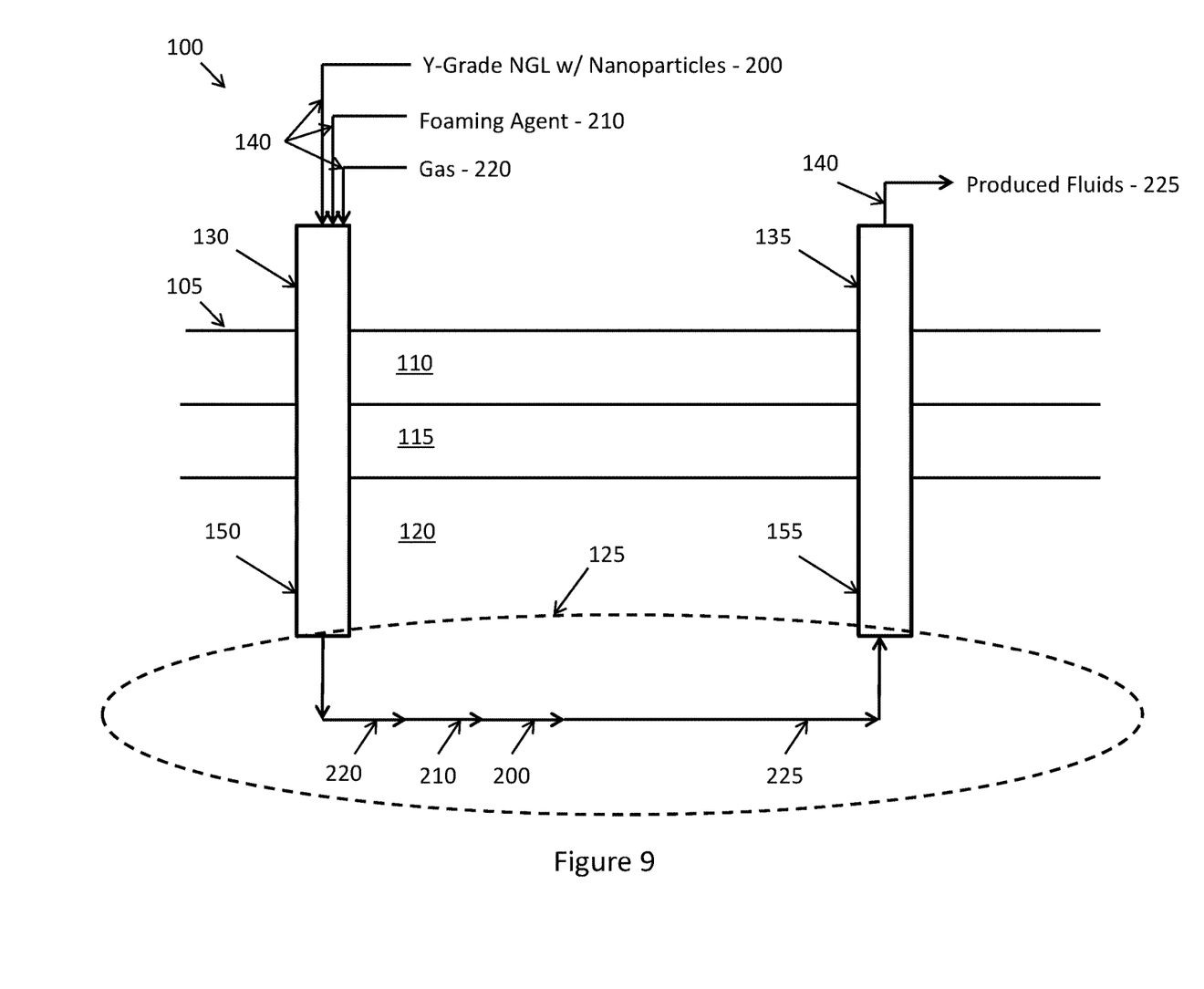
FIG. 9 is a schematic view showing a hydrocarbon recovery system injecting an injection fluid and foaming agent through an injection well into a hydrocarbon bearing reservoir to generate foam in-situ within the reservoir and producing hydrocarbons from the reservoir though a separate production well according to one embodiment.

FIG. 9 is a schematic view showing the hydrocarbon recovery system 100 injecting the injection fluid 200, optionally the foaming agent 210, and the gas 220 through the injection well 150 into the hydrocarbon bearing reservoir 125 according to one embodiment. FIG. 9 illustrates a flooding process as known in the art. The gas 220 forces the injection fluid 200 further into the reservoir 125 toward a production well 155 that is spaced apart from the injection well 150. If using the foaming agent 210, the gas 220 forces the foam generated in-situ within the reservoir 125 further into the reservoir 125 toward the production well 155. Produced fluids 225 may be recovered from the reservoir 125 through wellhead equipment 135 and a fluid line 140 in fluid communication with the production well 155.

The Y-Grade NGL described herein is miscible with and helps reduce the viscosity of hydrocarbons in the reservoir 125 to increase mobility. The nanoparticles as described herein are configured to alter (e.g. increase) the wettability of the reservoir rock. Increasing the wettability of the reservoir rock increases the ability of the solid surfaces in the reservoir to reduce the surface tension of liquids in contact with the reservoir rock so that the liquid spreads over the surface and wets it. The nanoparticles adsorb to the surfaces of the reservoir rock and to allow more of the liquids in the reservoir 125, including the Y-Grade NGL and the hydrocarbons, to detach from the reservoir rock and accumulate for subsequent recovery.

The multitude of hydrocarbon bearing reservoirs and the nature and conditions present in the reservoirs can be addressed by the tunable nature of the eggshell and/or tethered ultrafine nanoparticles to provide greater wettability and recovery of hydrocarbons. When a nanoparticle is delivered to a pore site in the hydrocarbon bearing reservoir, the nanoparticle will enter the pore body and adsorb selectively within sites inside the pore bodies. The gas, such as nitrogen, will provide an energized stream to disperse and dispense the Y-Grade NGL containing the nanoparticles to the far reaches of the hydrocarbon bearing reservoir. The combination of the injection fluid and the gas will enhance the efficiency of wettability alteration treatment by the nanoparticles to the reservoir and thereby improve hydrocarbon recovery from the reservoir.

Due to its higher solvency power, the Y-Grade NGL has the potential to provide good volumetric sweep of the reservoir. The Y-Grade NGL has good ability to mix with the oil in the hydrocarbon bearing reservoir, causing it to swell and become less viscous, thereby detaching the oil from the reservoir rock by lowering or outright eliminating interfacial tensions between the injected Y-Grade NGL and the oil. The Y-Grade NGL further provides an excellent medium for carrying and delivering the nanoparticles to the hydrocarbon bearing reservoir while enhancing the flowability of the oil more freely within the reservoir.

In one embodiment, a method for improving the wettability of a hydrocarbon bearing reservoir comprising feeding nanoparticles in a Y-Grade NGL mixture to the reservoir, then injecting a gas into the reservoir. The hydrocarbon bearing reservoir includes conventional and unconventional reservoirs. The nanoparticles will adsorb on the surfaces of the hydrocarbon bearing reservoir, thereby improving the wettability of the surfaces of the hydrocarbon bearing reservoir.

In one embodiment, a method for recovering oil from a hydrocarbon bearing reservoir comprising the steps of feeding nanoparticles in a Y-Grade NGL mixture into the hydrocarbon bearing reservoir; closing the hydrocarbon bearing reservoir thereby to allow circulation of the nanoparticles in the hydrocarbon bearing reservoir; opening the hydrocarbon bearing reservoir; feeding nitrogen into the hydrocarbon bearing reservoir; and recovering oil from the hydrocarbon bearing reservoir. The hydrocarbon bearing reservoir includes conventional and unconventional reservoirs. The nanoparticles will adsorb on the surfaces of the hydrocarbon bearing reservoir, thereby improving the wettability of the surfaces of the hydrocarbon bearing reservoir.

In one embodiment, the nanoparticles are selected from the group consisting of eggshell, ultrafine nanoparticles and/or tethered, ultrafine nanoparticles with surface modification. In one embodiment, the nanoparticles comprise oleic acid or acrylic acid tethered to the surface of a silica nanoparticle. In one embodiment, the nanoparticles comprise a silica core wrapped with an outer shell of non-conductive or conductive polymers selected from the group consisting of polyethylene glycol and polyaniline. In one embodiment, the outer shell is further impregnated with a charged ionic species. In one embodiment, the nanoparticles comprise a mixture of different nanoparticles described herein.

In one embodiment, the tunable injection fluid will include a well specific prescribed combination of the embodiments described herein.

Any of the embodiments (in whole or in part) described herein can be used in combination with any other embodiment (in whole or in part) described herein.

While the foregoing is directed to certain embodiments, other and further embodiments may be devised without departing from the basic scope of this disclosure.

The invention claimed is:

1. A method for improved hydrocarbon recovery, comprising:
    injecting an injection fluid through an injection well into a hydrocarbon reservoir, wherein the injection fluid comprises Y-Grade natural gas liquids (NGL) and surface functionalized nanoparticles, wherein the Y-Grade NGL is an unfractionated hydrocarbon mixture that is a byproduct of a de-methanized hydrocarbon stream and comprises ethane, propane, butane, isobutene, pentane, and less than 1 percent methane, wherein the surface functionalized nanoparticles are configured to alter wettability of solid surfaces and alter the interfacial tension between fluids in the reservoir, and wherein the surface functionalized nanoparticles are hydrophobic;
    providing the hydrophobic surface functionalized nanoparticles in a solvent solution that solubilizes with the Y-Grade NGL;
    injecting a gas through the injection well into the reservoir to displace the injection fluid into the reservoir; and
    producing hydrocarbons from the resource reservoir via the injection well or a production well offset from the injection well.

2. The method of claim 1, wherein the gas comprises nitrogen, carbon dioxide, natural gas, produced gas, or combinations thereof.

3. The method of claim 1, wherein the injection fluid and the gas are simultaneously injected into the reservoir.

4. The method of claim 1, wherein the injection fluid and the gas are alternately injected into the reservoir, including injecting the gas into the reservoir prior to the injection fluid.

5. The method of claim 1, wherein the injection fluid further comprises xylene, toluene, or heptane configured to solubilize and remove organic deposits including paraffin or asphaltenes from the reservoir.

6. The method of claim 1, wherein the surface functionalized nanoparticles are configured to retain stable properties under reservoir conditions, including reservoir temperature, reservoir pressure, and reservoir fluid composition.

7. The method of claim 1, wherein the surface functionalized nanoparticles have a core particle and an outer shell surrounding the core particle.

8. The method of claim 7, wherein the core particle is a silica core, and wherein the outer shell is a non-conductive or conductive polymer, selected from a group consisting of polyethylene glycol and polyaniline, and impregnated with a charged ionic species.

9. The method of claim 1, wherein the surface functionalized nanoparticles have a core particle and a tethered material bonded to the core particle.

10. The method of claim 9, wherein the core particle comprises a silica core, and wherein the tethered material comprises oleic acid or acrylic acid bonded to the surface of the silica core.

11. The method of claim 1, wherein the injection fluid further comprises a foaming agent configured to generate foam in-situ within the reservoir for mobility control resulting in an efficient distribution within the reservoir.

12. The method of claim 11, wherein the foaming agent is a fluoro-based or siloxane-based surfactant.

13. The method of claim 11, wherein the foaming agent is a hydrophobic nanoparticle with a fluoro-based or siloxane-based surfactant surface immobilization.

14. The method of claim 11, wherein the foaming agent is a mixture of a fluoro-based or siloxane-based surfactant, and a hydrophobic nanoparticle with a fluoro-based or siloxane-based surfactant surface immobilization.

15. The method of claim 11, wherein the foaming agent has a core particle and an outer shell surrounding the core particle.

16. The method of claim 15, wherein the core particle is a silica core, and wherein the outer shell is a non-conductive or conductive polymer, selected from a group consisting of polyethylene glycol and polyaniline, and impregnated with a charged ionic species.

17. The method of claim 11, wherein the foaming agent has a core particle and a tethered material bonded to the core particle.

18. The method of claim 17, wherein the core particle comprises a silica core, and wherein the tethered material comprises oleic acid or acrylic acid bonded to the surface of the silica core.

19. A method for improved hydrocarbon recovery, comprising:
    injecting an injection fluid through an injection well into a hydrocarbon reservoir, wherein the injection fluid comprises Y-Grade natural gas liquids (NGL) and surface functionalized nanoparticles, wherein the Y-Grade NGL is an unfractionated hydrocarbon mixture that is a byproduct of a de-methanized hydrocarbon stream and comprises ethane, propane, butane, isobutene, pentane, and less than 1 percent methane, wherein the surface functionalized nanoparticles are configured to alter wettability of solid surfaces and alter the interfacial tension between fluids in the reservoir, wherein the injection fluid further comprises a foaming agent configured to generate foam in-situ within the reservoir for mobility control resulting in an efficient distribution within the reservoir, and wherein the foaming agent is a hydrophobic nanoparticle with a fluoro-based or siloxane-based surfactant surface immobilization;
    injecting a gas through the injection well into the reservoir to displace the injection fluid into the reservoir; and
    producing hydrocarbons from the resource reservoir via the injection well or a production well offset from the injection well.

20. A method for improved hydrocarbon recovery, comprising:
    injecting an injection fluid through an injection well into a hydrocarbon reservoir, wherein the injection fluid comprises Y-Grade natural gas liquids (NGL) and surface functionalized nanoparticles, wherein the Y-Grade NGL is an unfractionated hydrocarbon mixture that is a byproduct of a de-methanized hydrocarbon stream and comprises ethane, propane, butane, isobutene, pentane, and less than 1 percent methane, wherein the surface functionalized nanoparticles are configured to alter wettability of solid surfaces and alter the interfacial tension between fluids in the reservoir, wherein the injection fluid further comprises a foaming agent configured to generate foam in-situ within the reservoir for mobility control resulting in an efficient distribution within the reservoir, and wherein the foaming agent is a mixture of a fluoro-based or siloxane-based surfactant, and a hydrophobic nanoparticle with a fluoro-based or siloxane-based surfactant surface immobilization;

injecting a gas through the injection well into the reservoir to displace the injection fluid into the reservoir; and producing hydrocarbons from the resource reservoir via the injection well or a production well offset from the injection well.

* * * * *